Mar. 13, 1923.

W. F. STIMPSON

BEARING FRAME FOR SCALES

Filed Oct. 15, 1919

1,448,317

Inventor
Walter F. Stimpson
By Whittemore, Hulbert, and Whittemore
Attorneys

Patented Mar. 13, 1923.

1,448,317

UNITED STATES PATENT OFFICE.

WALTER F. STIMPSON, OF LOUISVILLE, KENTUCKY.

BEARING FRAME FOR SCALES.

Application filed October 15, 1919. Serial No. 330,697.

*To all whom it may concern:*

Be it known that I, WALTER F. STIMPSON, a citizen of the United States of America, residing at Louisville, in the county of Jefferson and State of Kentucky, have invented certain new and useful Improvements in Bearing Frames for Scales, of which the following is a specification, reference being had therein to the accompanying drawings.

This invention relates to bearing frames for weighing scales, and it is the object of the invention to mount upon the bearing frame of a weighing scale one or more adjustable extension members to assist in supporting the load having too great an extent to be suitably supported by the platform of the scale.

It is a further object of the invention to provide one or more extension members to assist in supporting an article resting upon the platform of a scale, which extension member will form a normal part of the zero indicating load upon the platform lever.

Still another object of the invention is to provide extension load-supporting members for a scale, which members normally will be concealed beneath the platform of the scale and will be adjustable for use in- to laterally projecting positions.

Figure 1:
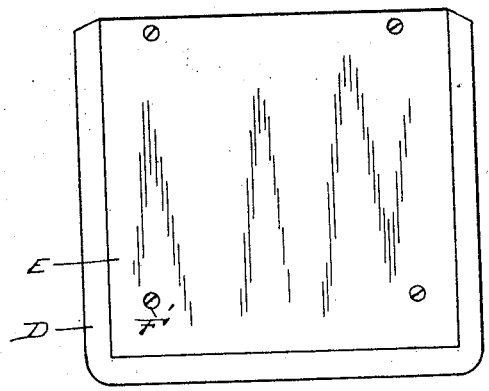
Figure 1 is a plan view of a bearing frame improved in accordance with the invention, the weighing platform being in its position of use upon said frame.

In these views, the reference character B designates an indicating portion of a weighing scale frame, and C the platform levers. Said levers support a frame D which provides a bearing or seat for the platform E. The frame D is formed with a central aperture F which underlies the major portion of the platform E. The latter is preferably formed by a plate of sheet metal and is secured to the frame D by screws F'. The platform E is raised slightly above the main body of the frame D by a rib G, rising integrally from said frame and substantially surrounding the aperture F, the marginal portion of the platform being seated upon said rib. The major portion of the rib G is set back slightly from the aperture F, but certain portions of said rib, indicated at H, are offset at each side of said aperture so as to border the latter, Forward of the rib portions H a pair of lugs I project oppositely from the frame D into the central aperture thereof, said lugs respectively having integral bosses J rising therefrom, which bosses are engaged by the screws F' attaching the forward portion of the platform to the frame. The screws attaching the rear portion of the platform to the frame engage a pair of upstanding lugs K.

Figure 2:
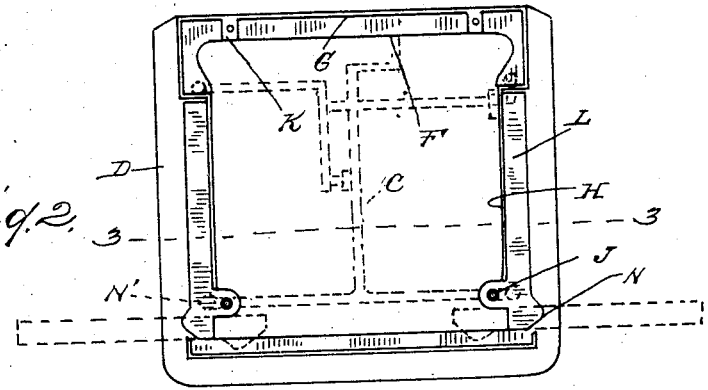
Figure 2 is a similar view, omitting said platform and indicating in dash-lines, the platform levers and the indicating portion of the scale frame.
Figure 3:
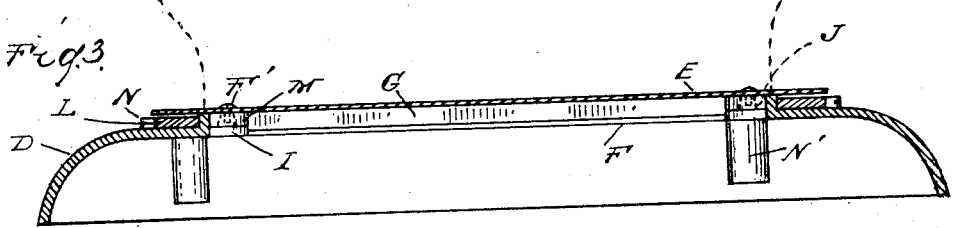
Figure 3 is a sectional view taken upon line 3—3 of Figure 2, the scale base and indicating portion of the frame being indicated in dash-lines.

By offsetting the portions H of the ribs G, provision is made for accommodating a pair of bars L between the platform and frame at each side of the latter, said bars being formed at their forward ends with laterally projecting lugs M which are super-posed upon the lugs I of the frame when said bars are in the described positions. The lugs M are apertured to pivotally engage the bosses J and the bars L are adapted to swing about the axes thus established from the stored positions shown in full lines in Figure 2 to the positions of use indicated in dash lines in the same figure. When in their stored positions, the bars L are entirely concealed beneath the platform E with the exception of laterally projecting lugs M formed upon said bars slightly forward of their pivotal points, said lugs projecting sufficiently in the stored positions of the bars L to allow the bars to be swung from their stored positions to their positions of use by pressure manually exerted upon said lugs. In their positions of use the bars L project laterally substantially in a perpendicular relation to the sides of the platform and are adapted to co-act with the platform in supporting any load having a width exceeding that of the platform. The frame D is formed with legs N suitable for supporting said frame upon the platform levers, this provision being no feature of the present invention.

It is to be noted that the extension load supports formed by the bars L constitute a part of the normal load upon the platform levers, that is to say, the load corresponding to a zero indication of the scale. It is to be further observed that said extension members are normally substantially concealed and entirely out of the way when the scale is being employed for weighing articles that will readily rest upon the platform, but may in a moment's time be adjusted to provide supports supplementing the platform when occasion for the same arises.

What I claim as my invention is:

1. In a weighing scale, the combination with the bearing frame of said scale, and a platform resting upon said frame, of a supplemental load support pivotally adjustable from a stored position between said frame and platform to an outwardly projecting position of use.

2. In a weighing scale, the combination with the bearing frame of said scale, of a supplemental load support pivotally mounted on said frame and adjustable about its pivotal axis substantially in the plane of said frame from a stored position close adjacent said frame to a projecting position of use.

3. In a weighing scale, the combination with the bearing frame thereof, of a platform mounted upon said frame and having a marginal portion spaced above the frame, and a bar forming a load support supplemental to the platform normally stored between the frame and said marginal portions of the platform and adjustable to a position outwardly projecting from the platform.

4. In a weighing scale, the combination with a bearing frame therefor and a platform surmounting said frame, the frame having an aperture underlying the major portion of the platform, of a lug upon said frame marginal to said aperture, a boss upon said lug, an extension load support pivotally engaging said boss and retained in such engagement by the platform, said support being adjustable from a stored position between the platform and frame, to a projecting position of use.

5. In a weighing scale, the combination with the bearing frame thereof, and a platform resting upon said frame and having a marginal portion spaced there above, of an extension load support pivoted upon said frame between the same and said marginal portion of the platform, said support having a lug projecting in its stored position beyond the margin of the platform and manually engageable to adjust said support to a projecting position of use.

6. In a weighing scale, the combination with a bearing frame of said scale and a platform resting upon said frame, of a pair of bars pivotally mounted upon said frame and adjustable from a parallel stored position adjacent said frame to aligned oppositely projecting positions in which said bars supplement said platform in supporting a load.

7. In a weighing scale, the combination with the platform thereof, and a bearing frame carrying said platform, said frame and platform having portions spaced marginally of the platform, of a supplemental load support normally stored in said space between the frame and platform and outwardly adjustable to a projecting position of use.

In testimony whereof I affix my signature.

WALTER F. STIMPSON.